(12) United States Patent
Pettersen et al.

(10) Patent No.: US 6,911,741 B2
(45) Date of Patent: Jun. 28, 2005

(54) WINDMILL

(75) Inventors: Torolf Pettersen, Ranheim (NO); Anders Wickstrom, Karlstad (SE); Mikael Lindberg, Karlstad (SE)

(73) Assignee: Scan Wind Group AG, Trondheim (NO)

( * ) Notice: Subject to any disclaimer, the term of this patent is extended or adjusted under 35 U.S.C. 154(b) by 69 days.

(21) Appl. No.: 10/398,213

(22) PCT Filed: Oct. 18, 2001

(86) PCT No.: PCT/NO01/00419
§ 371 (c)(1), (2), (4) Date: Jul. 25, 2003

(87) PCT Pub. No.: WO02/33254
PCT Pub. Date: Apr. 25, 2002

(65) Prior Publication Data
US 2004/0041407 A1 Mar. 4, 2004

(30) Foreign Application Priority Data
Oct. 19, 2000 (NO) .......................... 20005273

(51) Int. Cl.$^7$ ................ F03D 9/00; H02P 9/04
(52) U.S. Cl. ..................... 290/44; 290/55
(58) Field of Search ............... 290/44, 55, 54

(56) References Cited
U.S. PATENT DOCUMENTS 4,239,977 A * 12/1980 Strutman ............ 290/44
4,291,235 A * 9/1981 Bergey et al. ............ 290/55
4,329,117 A * 5/1982 Doman .............. 416/170 R
4,517,467 A * 5/1985 Fuhring .............. 290/44
4,584,486 A * 4/1986 Quynn ................. 290/44
4,673,822 A * 6/1987 Kikuchi ............... 290/44
4,757,211 A * 7/1988 Kristensen ............ 290/55
6,016,015 A * 1/2000 Willard, Jr. ............ 290/55
6,285,090 B1 * 9/2001 Brutsaert et al. ......... 290/55

FOREIGN PATENT DOCUMENTS
WO         0159296         8/2001

* cited by examiner

Primary Examiner—Darren Schuberg
Assistant Examiner—Heba Elkassabgi
(74) Attorney, Agent, or Firm—Dennison, Schultz, Dougherty & MacDonald

(57) ABSTRACT

Wind power plant with a wind turbine with a turbine shaft with which a generator shaft, which can be an extension of the turbine shaft, is connected to the rotor (12) of an electric generator. The rotor is radially surrounded by a stator, the turbine shaft is journalled in two bearing housings with bearings arranged on a base at the top of a tower, the base is pivotable around a vertical axis, and a motor is provided to effect the pivoting. The generator shaft is integrated with or rigidly connected to a flexing turbine shaft, the stator and rotor are carried by the generator shaft, to allow the generator to follow the flexing movement of the turbine shaft and the stator is locked against turning by a non-rotatable coupling which transfers substantially no bending moment or axial force acting against the flexing of the turbine shaft due to the bending moment acting on the turbine shaft from its hub, the bearings being provided to allow flexing of the turbine shaft.

8 Claims, 4 Drawing Sheets

WINDMILL

Figure 1:
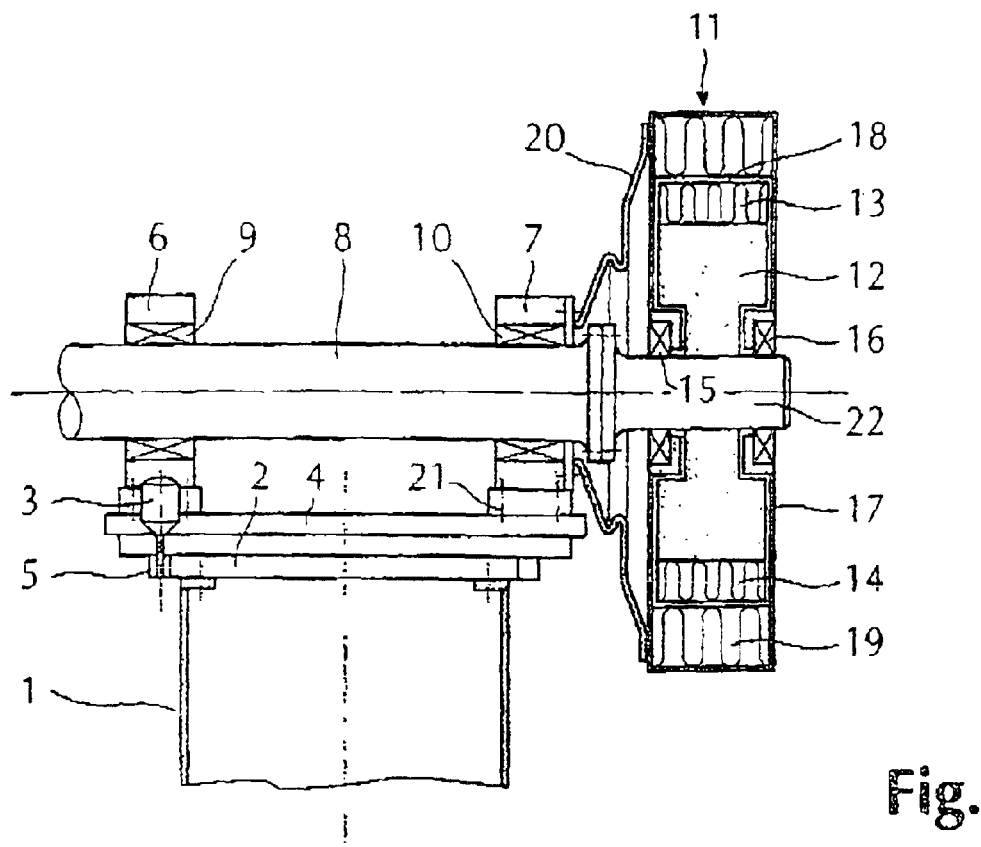

The invention relates to a wind power plant according to the introduction of claim 1.

PRIOR ART AND ITS WEAKNESSES

A major technical challenge in the design and development of wind power plants, is to ensure that the bending moment acting on the turbine hub from the blades does not create damaging deformations in the remaining structure. This relates particularly to deformations which may influence the air gap between the rotor and the stator when the turbine shaft carries an electric generator without any intermediate gearbox, or deformations straining the wheels of the gearbox and reducing the service life when a gearbox is used between the turbine shaft and the generator It is known to provide having wind turbine powering a generator arranged at the top of a column or tower. One solution is to connect the hub of the wind turbine directly to the rotor. The rotor is in turn carried by a base connected to the top of the tower, and the stator is carried by the base without making any effort to coordinate the movements of the rotor and the stator. Experience shows that this design does not give the necessary control of the air gap between the rotor and the stator upon a bending moment strain being set up on the turbine shaft from the hub of the wind turbine. Also the generator can not be made ready for use prior to mounting. Another solution is proposed in German Patent Publication 4402184 A1, wherein the hub of the wind turbine is connected directly to the rotor of the generator without any connecting gearbox and wherein the rotor and the stator is connected through two bearings providing a coordinated movement. This solution allows for premounting of the generator as a complete unit in a factory, and testing prior to the on site mounting.

Calculations shows that even this design will not provide a desirable constant air cap, when the wind turbine exceeds a certain size in power and weight, without making the dimensions of the supporting base unecessary large.

It has also been proposed to arrange the generator on the opposite side of the wind turbine relative to the top of the tower and connect the wind turbine to the generator over a turbine shaft between the hub and the rotor of the generator—either in a rigid connection or over a coupling which transfers no bending moment, and without an intermediate gearbox—and wherein the turbine shaft and the generator are journalled in a support arrangement with two or more bearings integrated in the support arrangement. The purpose of this arrangement is to reduce the bending acting on the part of the shaft adjoining the generator, by forcing the shaft through radial reaction forces from the bearing, back to the neutral position relative to the bending of the shaft without this arrangment, to have a tight as possible air gap between the rotor and the stator. With this solution the bearings are subject to high bearing forces, and additionally the design requires a very rigid base to accomodate the increased bearing.

OBJECT

The main object of the invention is to provide a wind power plant wherein the stator and the rotor during operation maintain their mutual distance (air gap), independent on the deflection of the turbine shaft due to the bending moment acting on the hub of the wind turbine in the cases where the turbine shaft is connected directly to the generator. In the embodiments wherein a gearbox is arranged between the turbine shaft and the generator, the invention should relieve the gearbox from unexpected forces, which may reduce the service life relative to the norm.

THE INVENTION

The present invention is described in patent claim 1. This can be embodied in different ways and designs, which are adaptable to various sizes of wind turbines and different generator designs.

The present invention concerns the journalling of the turbine shaft in a wind power plant powered by a wind turbine at one end of the shaft, and wherein an electric generator is connected to the shaft either outside relative to two bearing housings, or between a bearing housing facing the wind turbine and a rear bearing housing, to reduce the effect of the bending moment acting on the shaft, due to forces acting on the hub of the wind turbine, on the air gap between the rotor and the stator of the generator, using a journalling according to patent claim 1.

This provides an advantageous combination of simple structure and favourable journalling properties which contributes to keep the air gap between the rotor and the stator of the generator as small and constant as possible during the operation of the wind power plant, and without straining the bearings excessively due to the forces created by the bending moment acting on the hub.

This enables a transfer of torque from the turbine shaft to the rotor, and from the rotor through the electrical field to the stator and via a non-rotatable coupling to one of or both bearing housings, or directly to the base.

Further advantageous features are stated in claims 2–10.

When using a gearbox interposed between the turbine shaft and the generator, the invention allows for a direct attachment of input in shaft of the gearbox to the turbine shaft, which then carries the gearbox which in turn carries a generator base supporting the generator, and wherein the rotor of the generator is connected to the output shaft of the gearbox, with a rigid or elastic coupling. The transfer of torque from the rotor to the stator and from there to the base will also in this case be carried out by the non-rotatable coupling which will be described for the direct driven generator.

EXAMPLES

Figure 2:
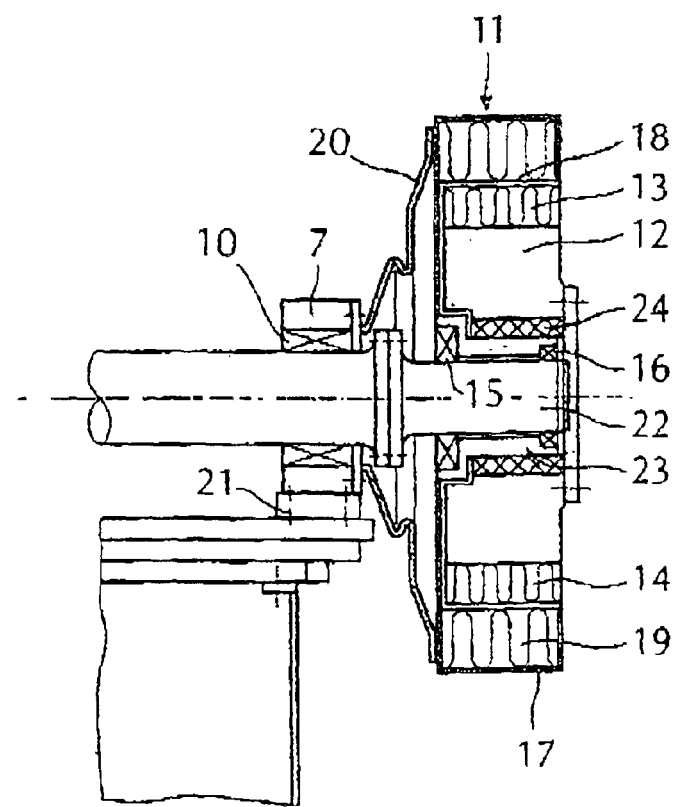
Figure 3:
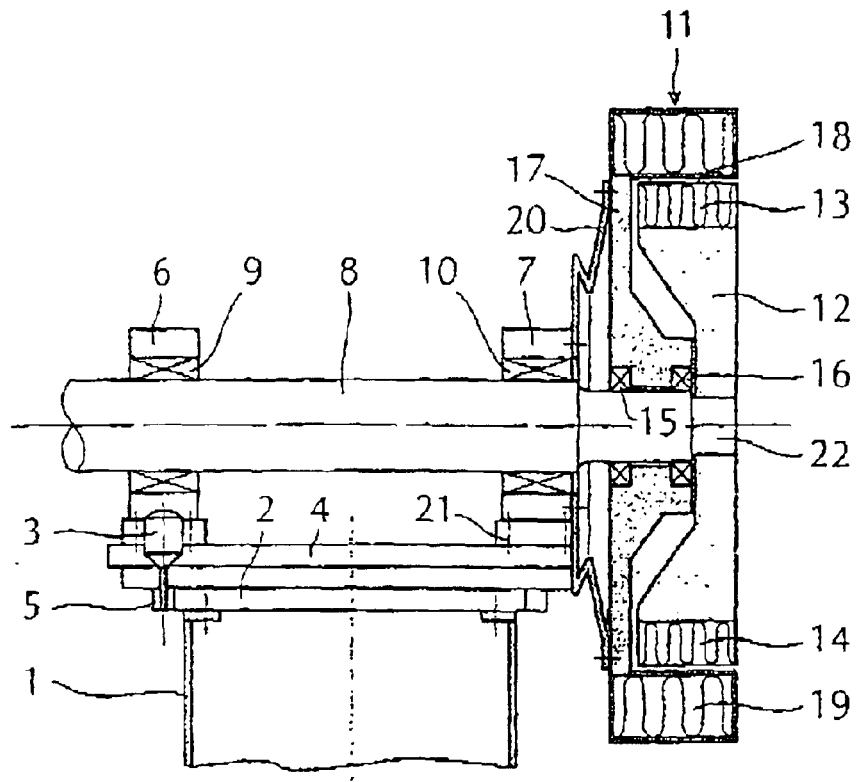
Figure 4:
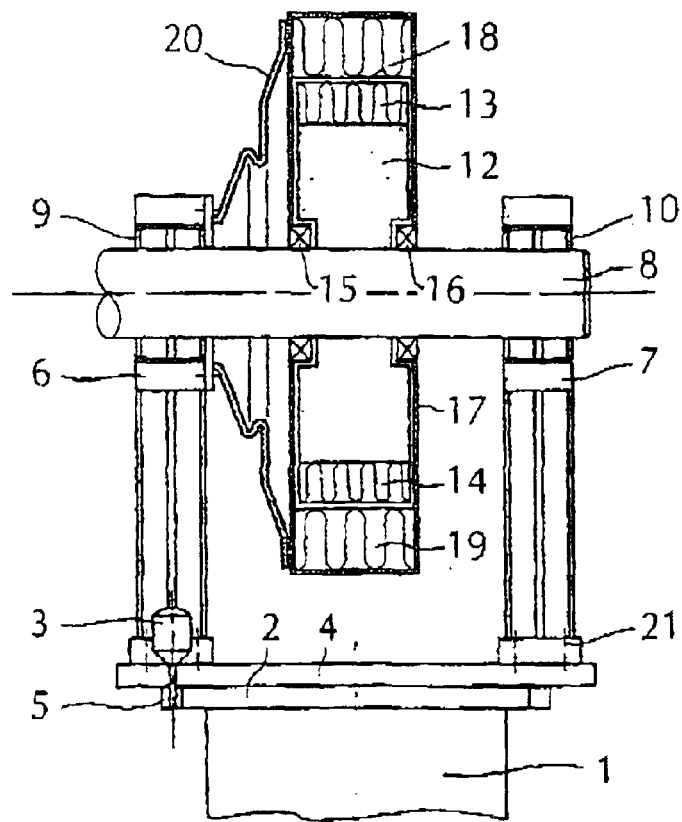
Figure 5:
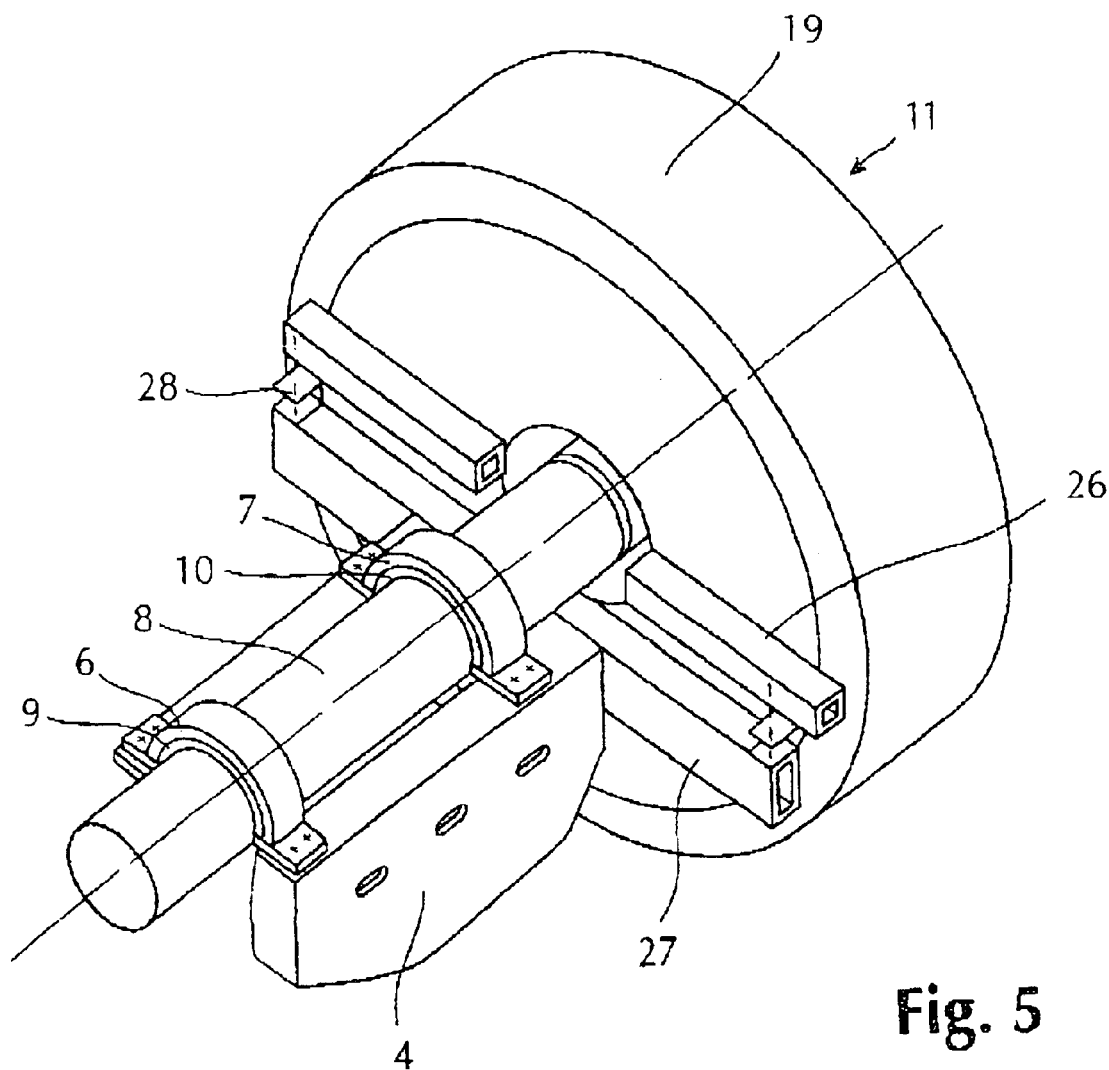
Figure 6:
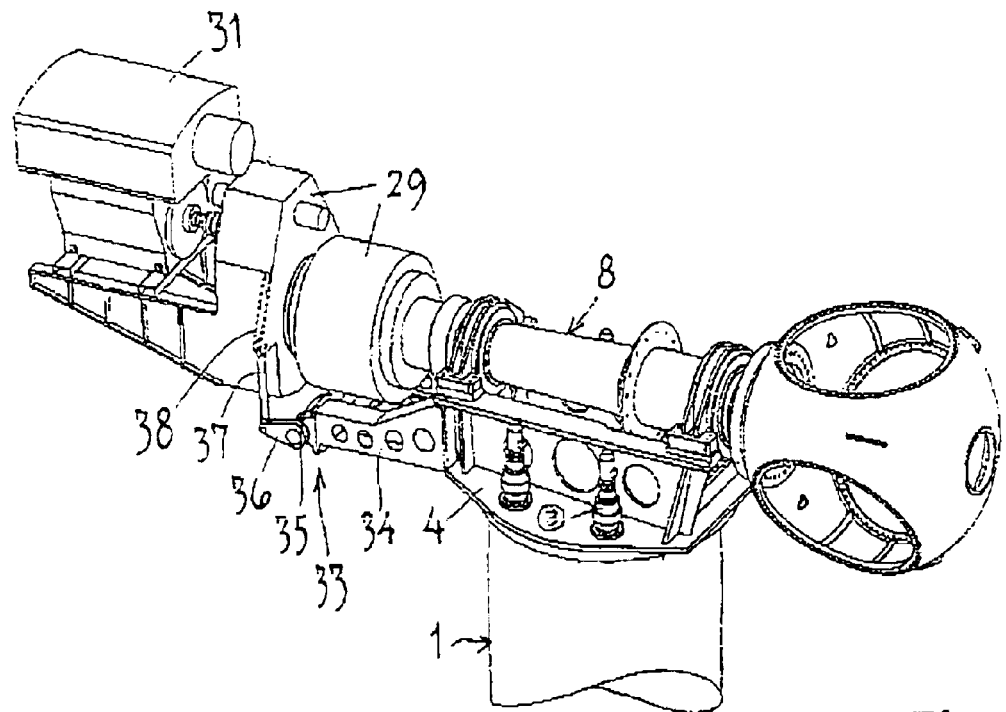
Figure 7:
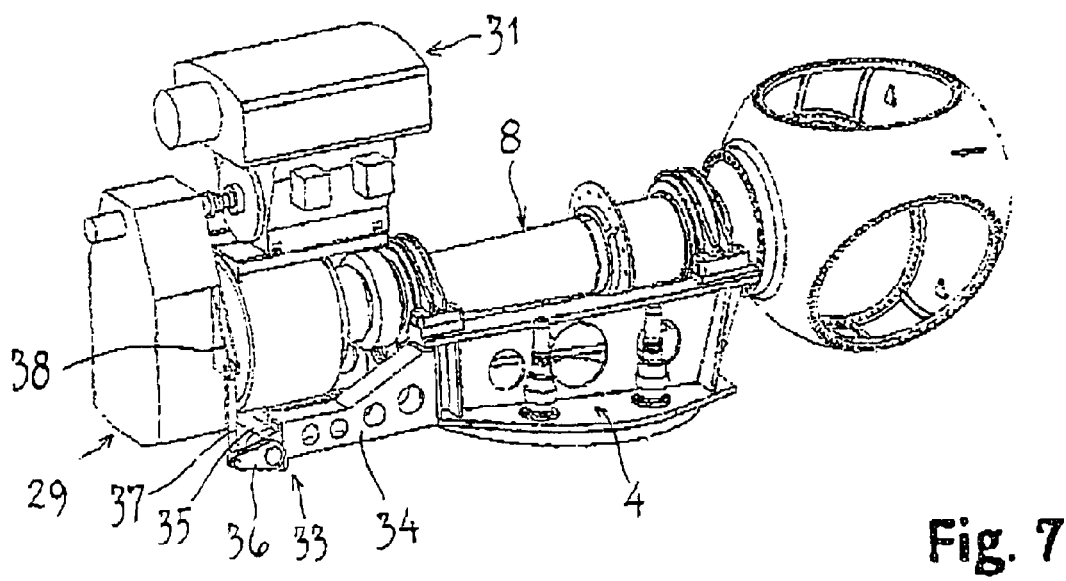

The invention is further described below with reference to the drawings wherein:

FIG. 1 shows a vertical section through an embodiment with a two-sided journalling of the stator on the shaft, FIG. 2 shows a vertical section of a corresponding embodiment with a single-sided journalling of the stator on the shaft, FIG. 3 shows a vertical section through a third embodiment with a two-sided journalling of the stator, which is carried by the shaft, FIG. 4 shows a vertical section through a further embodiment of the invention, with the generator arranged between two bearings, FIG. 5 shows a perspective view of an alternative embodiment of a non-rotatable coupling, FIG. 6 shows a perspective view of an alternative embodiment, with a gearbox connected to the turbine shaft, with a generator further being arranged on a generator support carried by the gear box in the extension of the, and wherein the torque transmission to the main base is provided by an adapted non-rotatable coupling, and FIG. 7 shows a perspective view of a further embodiment, with a gearbox connected to the turbine shaft, and with a generator arranged on a generator base carried by the gear box over the turbine shaft, and wherein the torque transmission to the main base is provided by an adapted non-rotatable coupling The invention illustrated in FIG. 1 is based on a coupling of the turbine shaft directly to the generator. It shows a vertical section lenghtwise through a shaft bearing according to an embodiment of the invention. On the top of a tower 1 a horizontal gear rim 2 is attached, which is used for turning of the higher parts of a wind power plant which is described in more detail below. Over the gear rim is a rigid base 4 which serves as a support for the shaft. The base 4 is rotable relative to the gear rim 2 around its vertical shaft by a suitable bearing. The rotation is activated by a motor 3 arranged at the side of the base 4 with a depending shaft with a gear engaging the gear rim 2.

The base 4 provides support for two bearing housings, a front bearing housing 6 facing the turbine, and a rear bearing housing 7. The bearing housings together carry the turbine shaft 8, which in turn carries a complete generator 11. Each bearing housing contains a hearing 9, 10, and is attached to the base 4 with bolts 21.

The generator rotor is carried by a generator shaft 22 which can be a continuation of the turbine shaft 8. The stator housing 17 is carried by bearings 15, 16 on the shaft 8. Bearings 15, 16 provide an air zap 18 which is as constant and small a possible, between the stator 19 and the rotor 12, independent of the deflection of the shaft.

The torque from the turbine shaft 8, which through the electric field is transferred to the stator housing 17, is transferred to the base via a non-rotatable coupling 20.

In FIGS. 6 and 7 an alternative embodiment of the invention is shown. A gearbox is arranged between the turbine shaft 8 and the generator 31, both of which mainly correspond to the previous description. The gearbox 29, the generator base 30 and the generator 31 all are free to follow the movement of the turbine shaft 8 in the opening between the bearing housing 7 and its connection to the gearbox 29, except in the direction of the torque. A non-rotatable coupling 33 provides transfer of the torque from the turbine shaft via the gearbox 29 to the generator 31 and the main base 4 and limits or totally eliminates damaging forces, which may otherwise result in damaging deformations of the gearbox and the generator. The non-rotatable coupling 33 comprises a bracket 34 in the form of two arms extending from the main base 4 towards the generator 31. The bracket 34 is rigidly attached to the main base and at the free end connected with a cross yoke 35. Further, at the free end, a knee link with two linked arms 36, 37 are linked to the end of the bracket or yoke 35 and at a bracket 38 on the side of the gearbox 29. A corresponding, symmetrically arranged knee link may be provided at the oposite side.

FUNCTION

The function of this arrangement is mainly described by the description and FIG. 1. The weight of and the forces acting on the shaft 8 and the generator 11 is carried by the bearings 9, 10 and transferred to the base 4. The turbine shaft 8 transfers the torque directly to the rotor 12 of the generator. The stator housing 17 is carried directly on the turbine shaft. A suitable size of shaft in the vacinity of the generator 11 provides sufficient rigidity to ultimately keep a constant and small air gap 18 between the rotor 12 and the stator 19. A non-rotatable coupling 20 in the form of an annular dish with a central, circumferential fold increases the pliability in an axial direction, results in transfer of the torque acting on the stator housing 17, due to the electrical field from the rotor 12, to the base 4 with minimum bending moment.

The non-rotatable coupling 20 is designed and sized to transfer only torque from the wind turbine, without deflection of the generator shaft 22 due to torque acting on the hub of the wind turbine.

The stator housing 17 thus will follow the movements of the rotor 12 and the generator shaft 22 and the air gap 18 is maintained mainly constant.

The total structure allows for testing the wind turbine and the generator as a complete unit before mounting in situ, and to hoist and mount it to the top of the tower as a readymade unit.

MODIFICATIONS

In FIG. 2 an alternative embodiment is shown, similar parts being provided with identical reference numerals as in FIG. 1, and wherein the generator shaft 22 is carried by a double journalled bushing 23 providing a stator hub, which with another bearing 24 carries the rotor 12. The generator shaft 22 has a dish 25 at the free end attached to the rotor 12 for transferring torque thereto.

In FIG. 3 a further embodiment based on the same principle is shown. In this case a stator dish 17 with a hub is carried by the generator shaft 22 with a double bearing, and extendeds into a flange on one side, carrying the active stator parts.

In FIG. 4, in which the same reference numerals as the previous Figures are used an embodiment is shown, which differs from the embodiments of FIGS. 1–3 by having the generator arranged between the bearing housings 6, 7. The non-rotatable coupling 20 is fastened correspondingly to the bearing housing 6 adjoining the wind turbine.

Generally, the non-rotatable coupling 20 may be fastened to an arbitrary bearing housing, or to the base 4.

In FIG. 5 a further modified embodiment of the base 4 and the bearing units 6, 7 is shown. In this case the stator 19 is provided with a radial pair of arms 26, extending horizontally at the base 4. The base 4 carries a beam 27 which is arranged parallell to the pair of arms 26. At both ends, the pair of arms and the beam is connected to a damping element 28, which can take torque, but not bending moment and axial forces. The damping elements 28 are provided to take possible moment shock, e g. due to short circuit.

FIGS. 6 and 7 shows usage of the invention wherein a gearbox 29 is arranged between the turbine shaft 8 and generator 31. Other embodiments of the non-rotatable coupling for transferring of torque from the turbine shaft via gearbox 29 and the generator 31, as long as it is provided for minimal force transfer between the turbine shaft 8 and the same elements in all directions except for the torque direction.

What is claimed is:

1. Wind power plant with a wind turbine with a turbine shaft (8) which with a generator shaft (22), which can be an extension of the turbine shaft, is connected to the rotor (12) of all electric generator (11), wherein the rotor (12) is radially surrounded by a stator (19), wherein the turbine shaft (8) is journalled in two bearing housings (6, 7) with bearings (9, 10) arranged on a base (4) at the top of a tower (1), wherein the base (4) is pivotable around a vertical axis, and wherein a motor (3) is provided to effect the pivoting, characterized in that the generator shaft (22) is integrated with or rigidly connected to a flexing turbine shaft (8), that the stator (19) and rotor (12) are carried by the generator shaft (22), to allow the generator (11) to follow the flexing movement of the turbine shaft (8), and that the stator (19) is locked against turning by a non-rotatable coupling (20) which transfers substantially no bending moment or axial force acting against the flexing of the turbine shaft (8) due to the bending moment acting on the turbine shaft (8) from its hub, the bearings (9 and 10) being provided to allow flexing of the turbine shaft (8).

2. Wind power plant according to claim 1, wherein the generator (11) is arranged on a side of the base (4), opposite to the wind turbine or between the bearing housings (6, 7), characterized in that the stator is connected to a non-rotatable coupling (20) provided to transfer torque and substantially no bending moment, preferably an annular dish with a circumferential fold, which connects the stator to a bearing housing.

3. Wind power plant according to claim 1, characterized in that the non-rotatable coupling (20) is provided for transferring the torque and dampening forces created upon a short circuit of the generator.

4. Wind power plant according to anyone of the claim 1, characterized in that the stator (19) is attached at the generator shaft (22) at one of its ends (FIG. 1) or with a double bearing (FIGS. 2–4) and that the rotor (12) is attached directly to the generator shaft (FIGS. 1, 3, 4) or with a dish to the end of the generator shaft (FIG. 2).

5. Wind power plant according to claim 1, characterized in that the stator (11) is carried on both sides with side elements (17) non-flexingly supporting the stator (11) non-flexing relative to the generator shaft (22) and the turbine shaft (8) attached to bearings (15, 16) which are carried by the generator shaft (FIGS. 1, 4).

6. Wind power plant according to claim 1, characterized in that the stator (11) is carried at one side by a dish element (17) non-flexingly supporting the stator relative to the generator shaft (22) and the turbine shaft (8) attached to bearings (15, 16) which are carried by the generator shaft (FIGS. 2, 3).

7. Wind pourer plant according to claim 1, characterized in that the stator (19) and the base (4) (FIG. 5) are connected by a couple of force transferring elements (29) being arranged radially away from the generator shaft (22) for transferring torque, e.g. in the form of elastic damping elements which are arranged between the ends of a pair of arms (26) on the stator and a beam (27) parallel therewith and attached to the base (4) to transfer torque from the stator (19) to the base (4) without exerting any bending moment or axial tension which may prevent flexing of the turbine shaft (8) with a bending moment acting on the shaft from the hub and also dampening forces which can be created by short circuit in the generator.

8. Wind power plant according to anyone of the claim 1, characterized in that the bearings (9 and 10) are spherical.

* * * * *